United States Patent
Kawazoe et al.

(10) Patent No.: US 8,218,158 B2
(45) Date of Patent: Jul. 10, 2012

(54) SHEET PROCESSING APPARATUS

(75) Inventors: Kenji Kawazoe, Yokohama (JP); Haruo Uchida, Yokohama (JP); Nozomu Nishiberi, Yokohama (JP); Yoshiaki Watanabe, Tokyo (JP); Yasuyuki Asai, Tokyo (JP); Mitsuru Kondo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 705 days.

(21) Appl. No.: 12/107,703

(22) Filed: Apr. 22, 2008

(65) Prior Publication Data

US 2008/0266622 A1 Oct. 30, 2008

(30) Foreign Application Priority Data

Apr. 27, 2007 (JP) .................. 2007-118316

(51) Int. Cl.
*G06K 15/00* (2006.01)
*B65H 5/00* (2006.01)
(52) U.S. Cl. ....... 358/1.12; 358/442; 358/496; 358/497; 358/498; 271/9.13; 271/225; 271/298; 271/303; 271/902
(58) Field of Classification Search .......... None
See application file for complete search history.

(56) References Cited

U.S. PATENT DOCUMENTS

| | | | | |
|---|---|---|---|---|
| 4,736,937 A | * | 4/1988 | Okuda et al. | 399/87 |
| 5,055,946 A | * | 10/1991 | Kurahashi et al. | 358/498 |
| 5,818,602 A | * | 10/1998 | Nakajima et al. | 358/296 |
| 7,006,262 B2 | * | 2/2006 | Kaneko et al. | 358/472 |
| 7,077,393 B2 | * | 7/2006 | Ishida | 270/37 |
| 2002/0051665 A1 | * | 5/2002 | Seto et al. | 399/388 |
| 2002/0081133 A1 | * | 6/2002 | Sawada | 399/401 |
| 2004/0119996 A1 | * | 6/2004 | Awai et al. | 358/1.12 |
| 2005/0225623 A1 | * | 10/2005 | Hsieh et al. | 347/104 |
| 2007/0003339 A1 | * | 1/2007 | Edwards et al. | 399/364 |

FOREIGN PATENT DOCUMENTS

| | | |
|---|---|---|
| JP | 06-072610 A | 3/1994 |
| JP | 6-164791 | 6/1994 |
| JP | 2000-185881 A | 7/2000 |

* cited by examiner

*Primary Examiner* — Marivelisse Santiago Cordero
*Assistant Examiner* — Miya J Cato
(74) *Attorney, Agent, or Firm* — Canon USA Inc IP Division

(57) ABSTRACT

A sheet processing apparatus includes a feeding portion that feeds an original or a recording medium, a reading portion that reads an original, and a recording portion that performs recording on a recording medium. The original or recording medium fed from the feeding portion can be selectively conveyed to the reading portion or the recording portion, thereby allowing for compactness of the apparatus as well as cost reduction.

5 Claims, 11 Drawing Sheets

SHEET PROCESSING APPARATUS

BACKGROUND OF THE INVENTION

1. Field of the Invention

The present invention relates to a sheet processing apparatus equipped with a reading portion for reading an original and a recording portion for performing recording on a recording medium.

2. Description of the Related Art

In recent years, the popularization of multifunctional apparatuses having both a reading function for reading images of originals and a recording function for recording images onto recording media has been remarkable. Since sheet materials such as paper or plastic sheets are generally used as originals and recording media, these sheet materials will be generally referred to as "sheets" in the present invention, and an apparatus that reads a sheet (original) and performs recording on a sheet (recording medium) will be referred to as a sheet processing apparatus. In commonly used recording devices, for example, a plurality of feeding portions is provided at different locations, each of which holds a plurality of stacked recording sheets and separates and feeds the recording sheets in a one-by-one manner. These feeding portions can individually hold recording media of different types or sizes. There are also recording devices equipped with a reversing portion that reverses the front and back sides of a recording medium so that recording can be performed on both sides of a recording medium. Likewise, commonly used reading devices are equipped with a feeding portion that holds a plurality of stacked original sheets and separates and feeds the original sheets in a one-by-one manner. There are also reading devices having a reversing function for reversing the front and back sides of an original.

Generally, a feeding portion can hold a plurality of stacked original sheets or recording sheets and separate and feed the sheets in a one-by-one manner. A reversing portion can convey an original or recording medium while reversing the front and back sides of the original or recording medium. In a multifunctional apparatus of related art equipped with a reading device and a recording device, a feeding portion and a reversing portion are both provided for each of the reading portion and the recording portion. This is problematic in that the entire apparatus is large in size and requires high cost. For example, although Japanese Patent Laid-Open No. 6-164791 discloses an image comparing device configured to convey an original from a reading unit to a recording unit, this device is large is size since the reading unit and the recording unit are each equipped with a feeding unit. This device disclosed in Japanese Patent Laid-Open No. 6-164791 is an image comparing device equipped with a switching mechanism for selecting whether to eject an original having undergone a reading process or to convey the original for an image forming process, but does not function as a feeding device for feeding an original and recording medium.

SUMMARY OF THE INVENTION

The present invention provides a sheet processing apparatus having a reading portion and a recording portion, in which the number of feeding portions for feeding original sheets and recording sheets is reduced so as to achieve cost reduction and compactness.

According to an aspect of the present invention, a sheet processing apparatus includes a plurality of feeding portions configured to feed sheets; a reading portion configured to read an image of a sheet; a recording portion configured to perform recording on a sheet; and a reversing portion configured to reverse front and back sides of a sheet. A sheet fed from one of the plurality of feeding portions is selectively conveyed to the reading portion or the recording portion. The fed sheet is then read by the reading portion or undergoes recording at the recording portion. Subsequently, the fed sheet is reversed by the reversing portion and is then conveyed to the reading portion or the recording portion.

Further features of the present invention will become apparent from the following description of exemplary embodiments with reference to the attached drawings.

DESCRIPTION OF THE EMBODIMENTS

Embodiments of the present invention will now be described in detail below with reference to the drawings, in which like numerals reference like or equivalent elements.

First Embodiment

Figure 1:
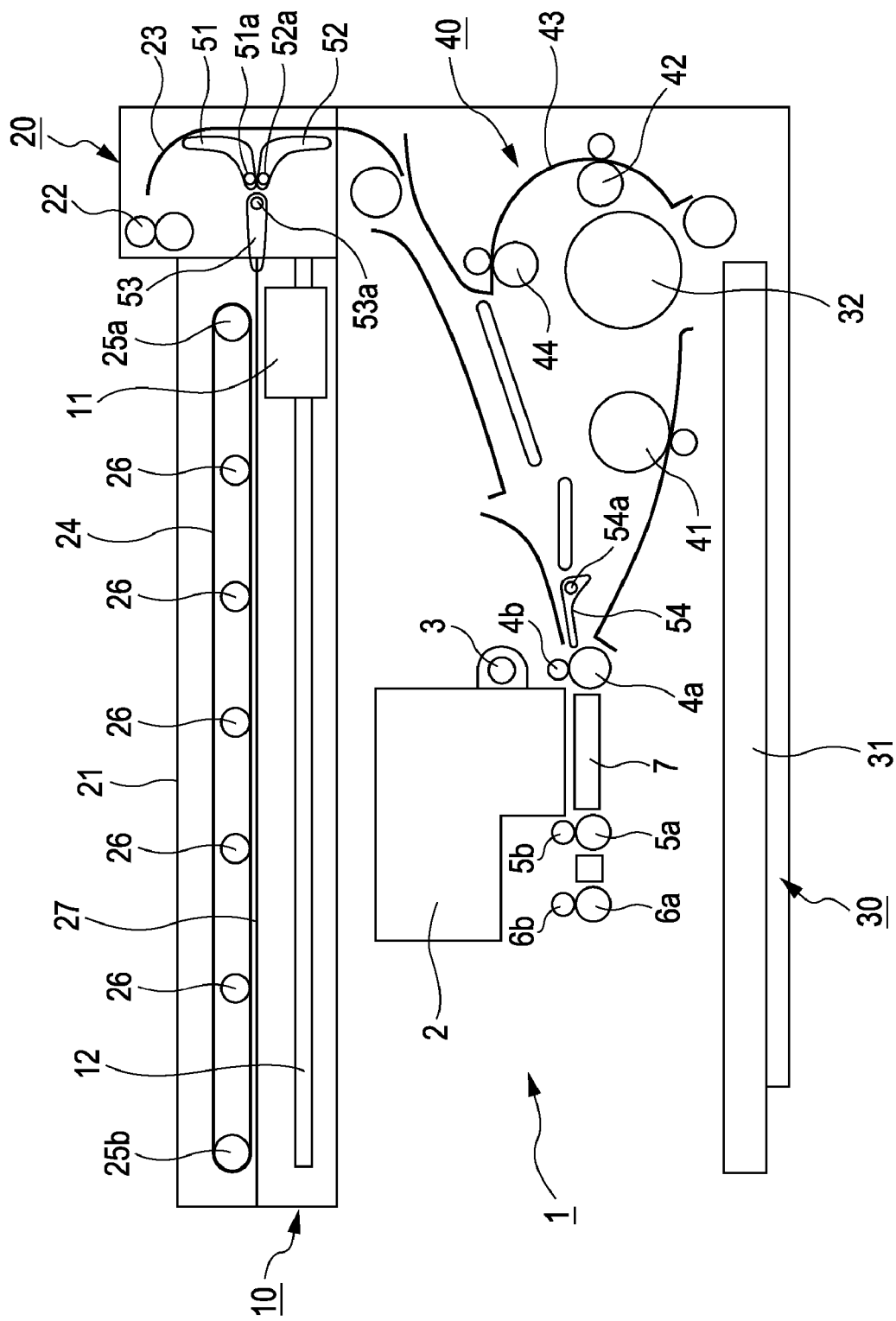
FIG. 1 is a side view of a sheet processing apparatus according to a first embodiment of the present invention in its initial state.

FIG. 1 is a side view of a sheet processing apparatus according to a first embodiment of the present invention in its initial state. In FIG. 1, the sheet processing apparatus includes a recording portion 1 and a reading portion 10. The sheet processing apparatus shown in FIG. 1 also includes a first feeding portion 20, a second feeding portion 30, and a reversing portion 40. The recording portion 1 has a recording head 2 that records an image onto a recording medium (sheet). The recording portion 1 is equipped with a guide shaft 3, a pair of conveying rollers 4a and 4b, a pair of first ejection rollers 5a and 5b, a pair of second ejection rollers 6a and 6b, and a platen 7. A carriage that carries the recording head 2 is supported and guided by the guide shaft 3 in a reciprocable fashion in the width direction (i.e. main scanning direction) of a recording medium.

The conveying rollers 4a and 4b, the first ejection rollers 5a and 5b, and the second ejection rollers 6a and 6b convey a recording medium while nipping the medium. The platen 7 is disposed facing the recording head 2 at a position between the pair of conveying rollers 4a and 4b and the pair of first ejection rollers 5a and 5b, so as to support a recording medium undergoing a recording operation from below. The reading portion 10 includes a reading head 11 equipped with a reading sensor such as a CCD (charge-coupled device) or a CIS (contact image sensor). The reading portion 10 also has a guide shaft 12 that guides the reading head 11 in a direction parallel to an original, a transparent glass 27 on which an original can be set, and a belt 24 used for setting an original on the glass 27. An original conveyed to the reading portion 10 is set on the glass 27 by the belt 24, and the reading head 11 is moved by a driving source such as a motor (not shown) so as to read the image on the original.

The first feeding portion 20 separates and feeds sheets (original sheets or recording sheets) one by one, and includes a first sheet-holding base 21, a first feeding roller 22, a guide mechanism 23, and the belt 24. The first feeding portion 20 is attached to the reading portion 10 and mainly separates and feeds original sheets one by one. A plurality of sheets (such as original sheets) stacked on the first sheet-holding base 21 is separated one by one by the first feeding roller 22 so as to be fed in a one-by-one manner from the first feeding roller 22. The guide mechanism 23 included in the first feeding portion 20 is controllable such that each fed sheet can be guided selectively to the recording portion 1 or the reading portion 10. The belt 24 is configured to convey each sheet guided by the guide mechanism 23 onto the upper surface of the glass 27 in the reading portion 10, and is suspended between driving pulleys 25a and 25b. An intermediate portion of the belt 24 is supported by a plurality of rotatable idle pulleys 26. Specifically, the belt 24 conveys each sheet, such as an original sheet, by being driven by a driving source such as a motor (not shown).

The second feeding portion 30 separates and feeds sheets (original sheets or recording sheets) one by one, and includes a second sheet-holding base 31 and a second feeding roller 32. The second feeding portion 30 is attached to the recording portion 1 and mainly separates and feeds recording sheets one by one. A plurality of sheets (such as recording sheets) stacked on the second sheet-holding base 31 is separated one by one by the second feeding roller 32 so as to be fed in a one-by-one manner from the second feeding roller 32. The reversing portion 40 has a pair of intermediate rollers 41 that convey a sheet (original or recording medium) from the recording portion 1 in a direction opposite to the direction in which the sheet is conveyed during a recording operation performed by the recording head 2. The reversing portion 40 also has a pair of first reversing rollers 42, a reversing guide 43 that guides a sheet when the sides thereof are being reversed, and a pair of second reversing rollers 44. These pairs of rollers are rotated by a driving source such as a motor (not shown), so as to convey a sheet conveyed from the recording portion 1 while reversing the front and back sides of the sheet. The pairs of rollers then convey the sheet back to the recording portion 1.

In the sheet processing apparatus having the configuration described above, when a sheet fed from the first feeding portion 20 or the second feeding portion 30 is to be conveyed to the recording portion 1 or the reading portion 10, it is necessary to switch the conveyance routes. To achieve this, a plurality of flappers for switching conveyance routes is disposed at predetermined locations on the sheet conveying path. Specifically, a first flapper 51 is rotatably supported by a shaft 51a and is provided for switchably conveying a sheet fed from the first feeding portion 20 towards the reading portion 10 or the recording portion 1. The first flapper 51 is switchable between a first position shown in FIG. 1 and a second position to which the first flapper 51 is rotated counterclockwise from the first position by a predetermined angle. Furthermore, a second flapper 52 is rotatably supported by a shaft 52a and is provided for conveying an original or a recording medium from the reading portion 10 to the recording portion 1 or from the recording portion 1 to the reading portion 10. The second flapper 52 is switchable between a first position shown in FIG. 1 and a second position to which the second flapper 52 is rotated clockwise from the first position by a predetermined angle.

Furthermore, a third flapper 53 is rotatably supported by a shaft 53a and is provided for conveying a sheet from the first feeding portion 20 to the reading portion 10, from the reading portion 10 to the recording portion 1, or from the recording portion 1 to the reading portion 10. The third flapper 53 is switchable between a first position shown in FIG. 1 and a second position to which the third flapper 53 is rotated clockwise from the first position by a predetermined angle. Moreover, a fourth flapper 54 is rotatably supported by a shaft 54a and is provided for switchably conveying a sheet from the recording portion 1 to the reversing portion 40. The fourth flapper 54 is switchable between a first position shown in FIG. 1 and a second position to which the fourth flapper 54 is rotated clockwise from the first position by a predetermined angle. In this manner, the conveyance routes are switchable by changing the position of the flappers.

Figure 2:
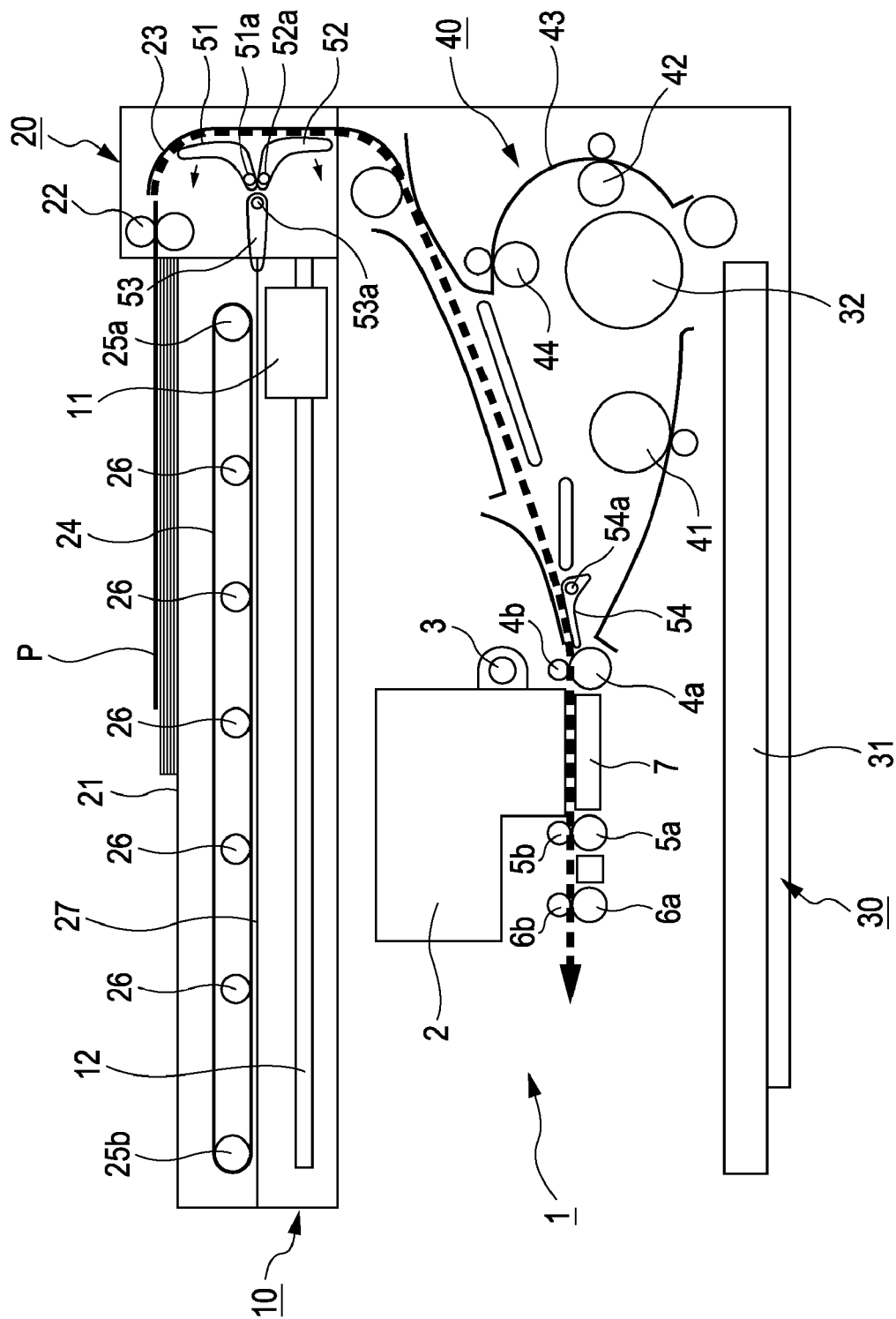
FIG. 2 is a side view showing a state where a sheet is being conveyed from a first feeding portion to a recording portion.
Figure 3:
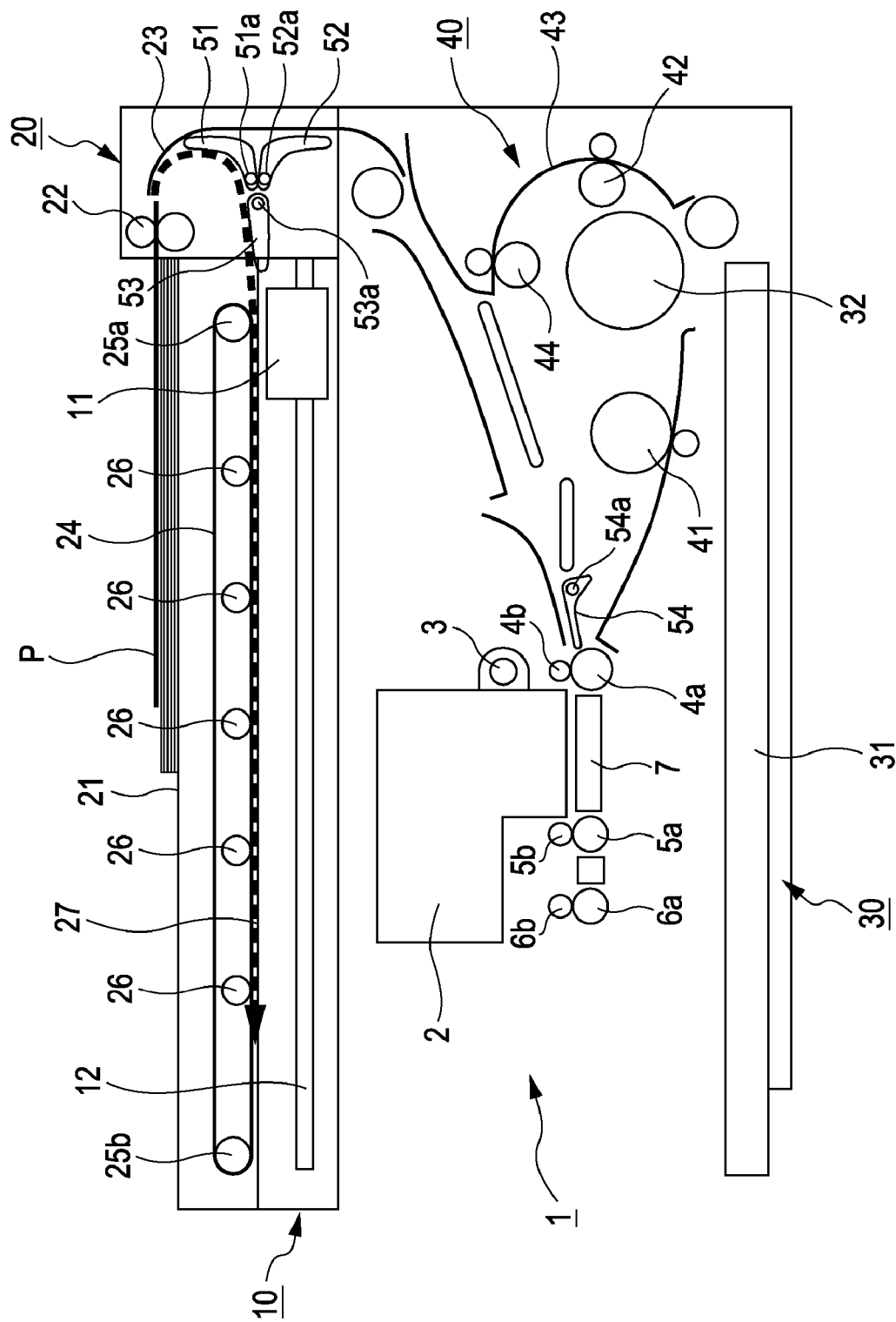
FIG. 3 is a side view showing a state where a sheet is being conveyed from the first feeding portion to a reading portion.

An operation for conveying an original or a recording medium in the sheet processing apparatus having the above-described configuration will now be described. FIG. 2 is a side view showing a state where a sheet is being conveyed from the first feeding portion 20 to the recording portion 1. In the state shown in FIG. 2, the first flapper 51 is rotated counterclockwise about the shaft 51a from the initial state shown in FIG. 1, and the second flapper 52 is rotated clockwise about the shaft 52a from the initial state. This forms a conveyance route extending from the first feeding portion 20 to the recording portion 1, whereby the original sheets or recording sheets stacked on the first sheet-holding base 21 can each be conveyed directly to the recording portion 1. FIG. 3 is a side view showing a state where a sheet is being conveyed from the first feeding portion 20 to the reading portion 10. The state in FIG. 3 is the same as the initial state in FIG. 1 in that a conveyance route extending from the first feeding portion 20 to the reading portion 10 is formed. In this state, the original sheets or recording sheets stacked on the first sheet-holding base 21 can each be conveyed to the reading portion 10. In the first embodiment, as shown in FIGS. 2 and 3, a sheet fed from the first feeding portion 20 can be selectively conveyed to the reading portion 10 or the recording portion 1.

Figure 4:
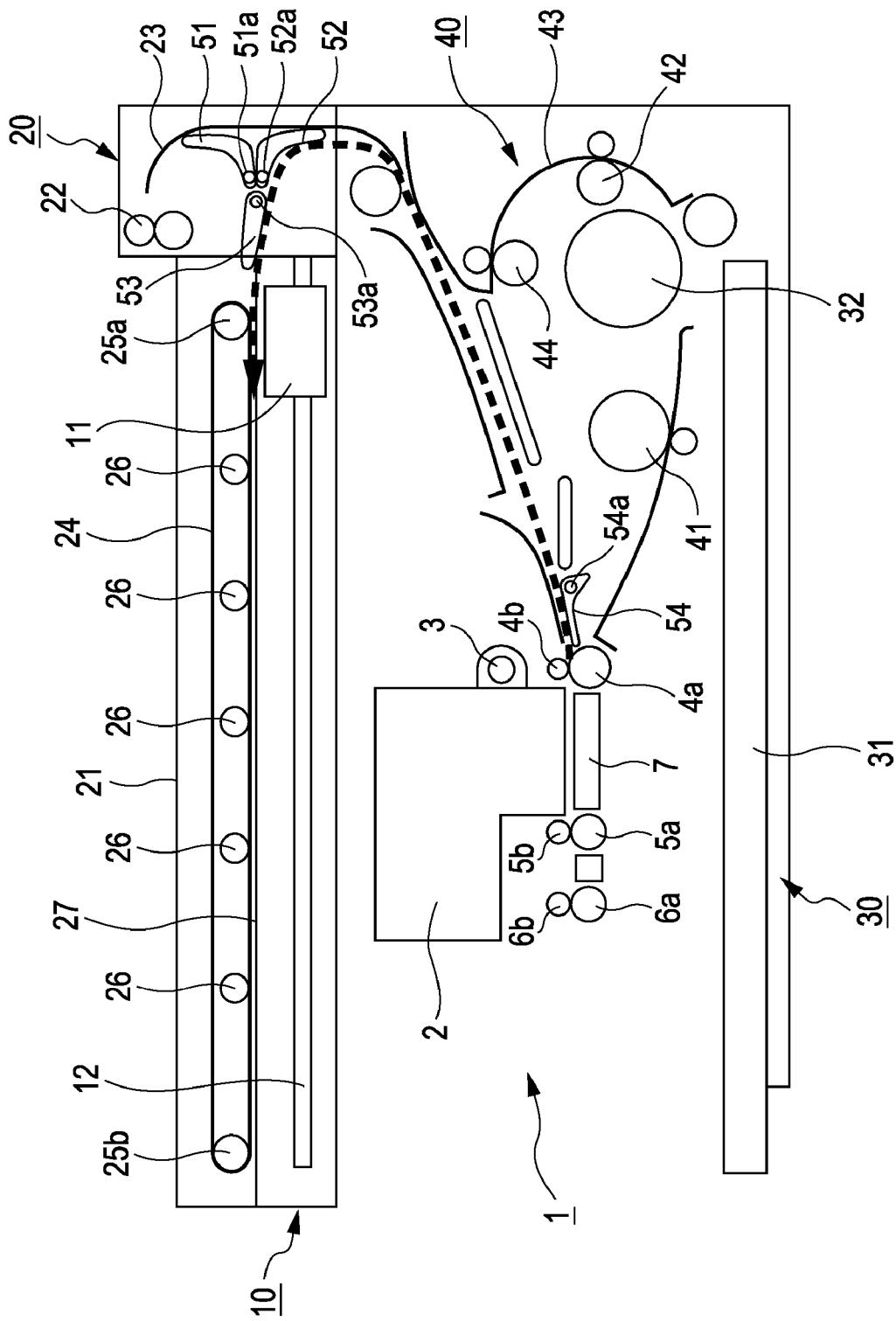
FIG. 4 is a side view showing a state where a sheet is being conveyed from the recording portion to the reading portion.
Figure 5:
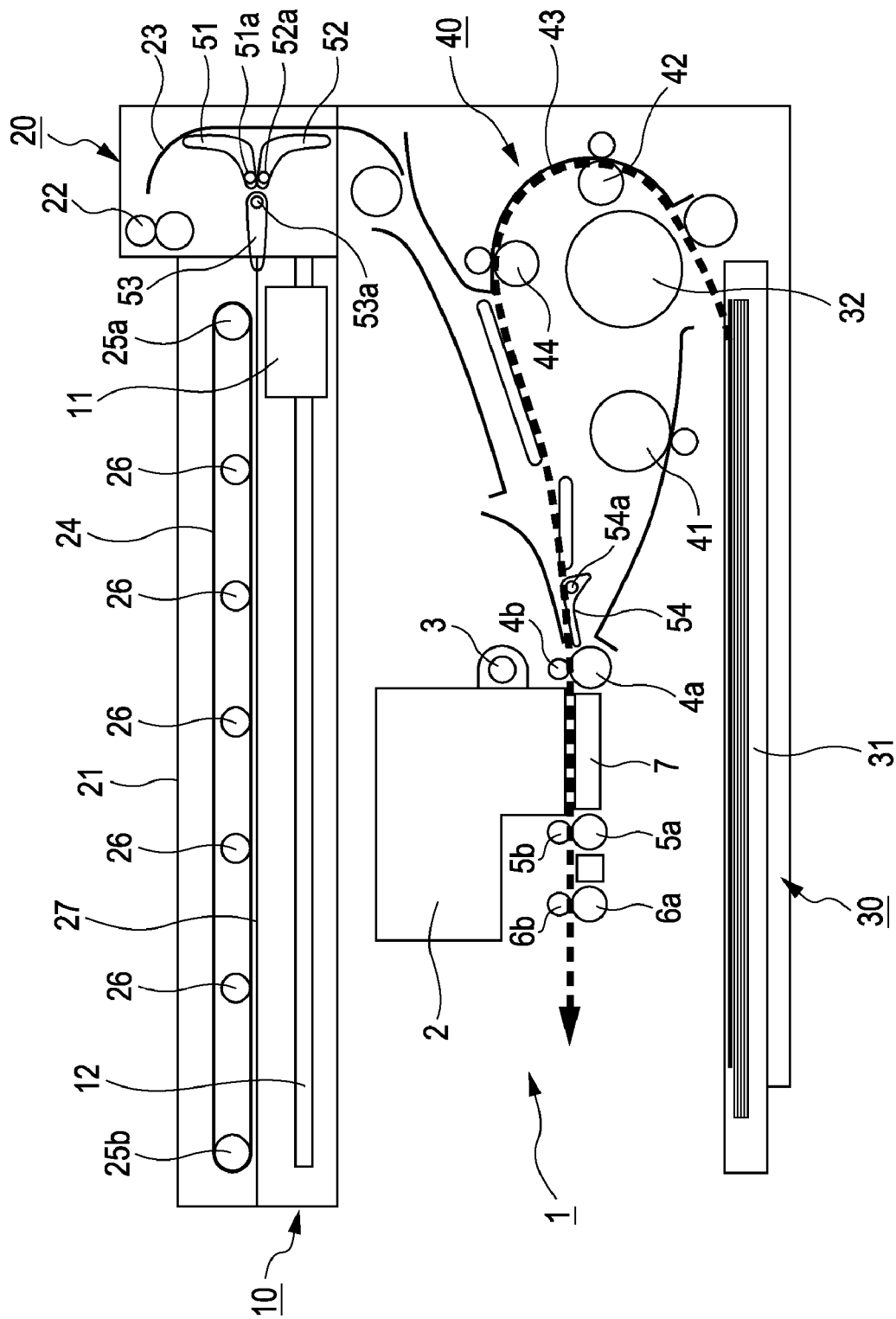
FIG. 5 is a side view showing a state where a sheet is being conveyed from a second feeding portion to the recording portion.

FIG. 4 is a side view showing a state where a sheet is being conveyed from the recording portion 1 to the reading portion 10. In the state shown in FIG. 4, the second flapper 52 is rotated clockwise about the shaft 52a from the initial state shown in FIG. 1, and the third flapper 53 is rotated clockwise about the shaft 53a from the initial state. This forms a conveyance route extending from the recording portion 1 to the reading portion 10, whereby a sheet conveyed backwards from the recording portion 1 can be conveyed to the reading portion 10. FIG. 5 is a side view showing a state where a sheet is being conveyed from the second feeding portion 30 to the recording portion 1. In the state shown in FIG. 5, the rotational positions of the flappers 51 to 54 are the same as those in the initial state shown in FIG. 1, and an original or recording medium fed from the second feeding portion 30 is conveyed through the reversing portion 40 before being conveyed to the recording portion 1.

Figure 6:
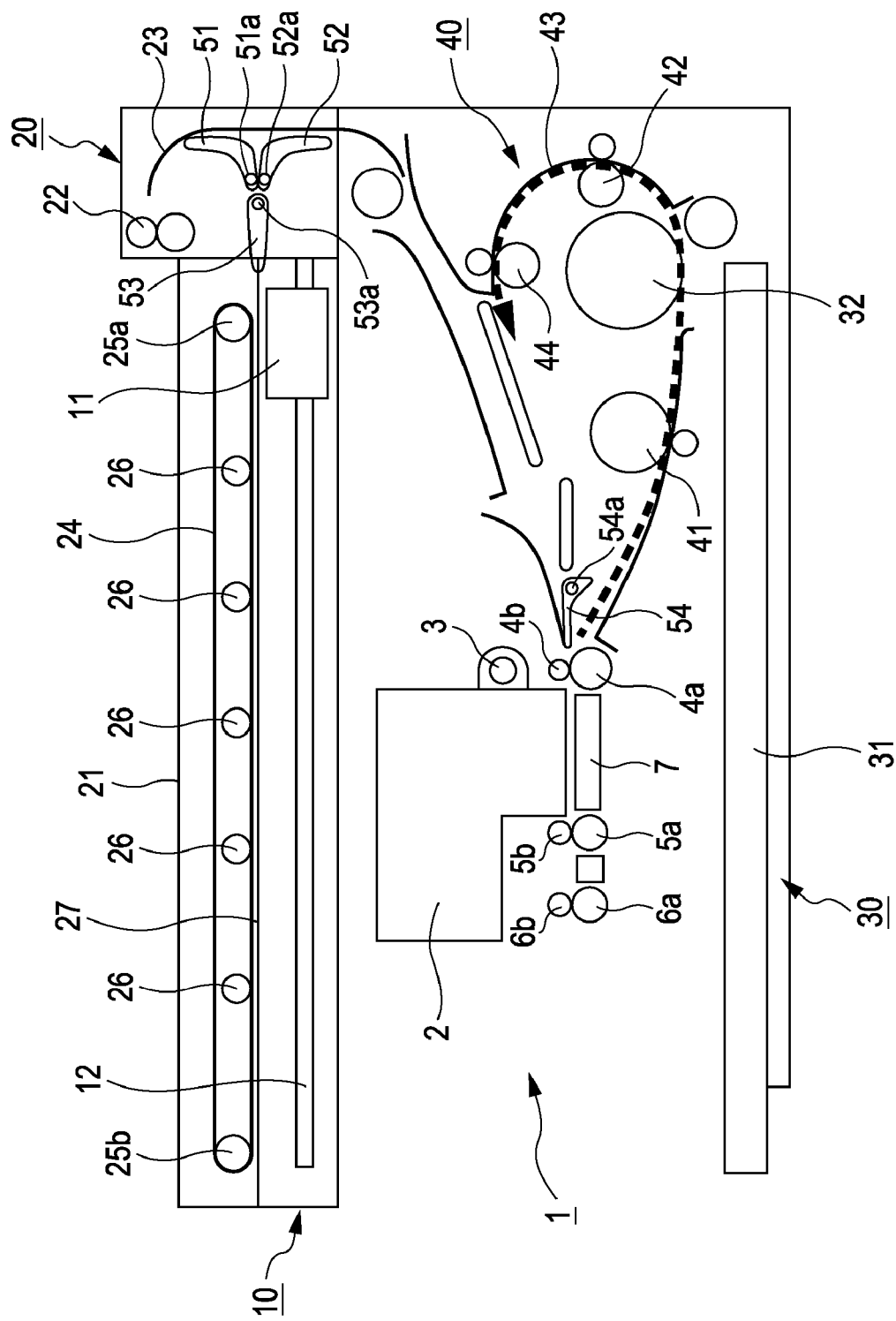
FIG. 6 is a side view showing a state where a sheet is being conveyed from the recording portion to a reversing portion.
Figure 7:
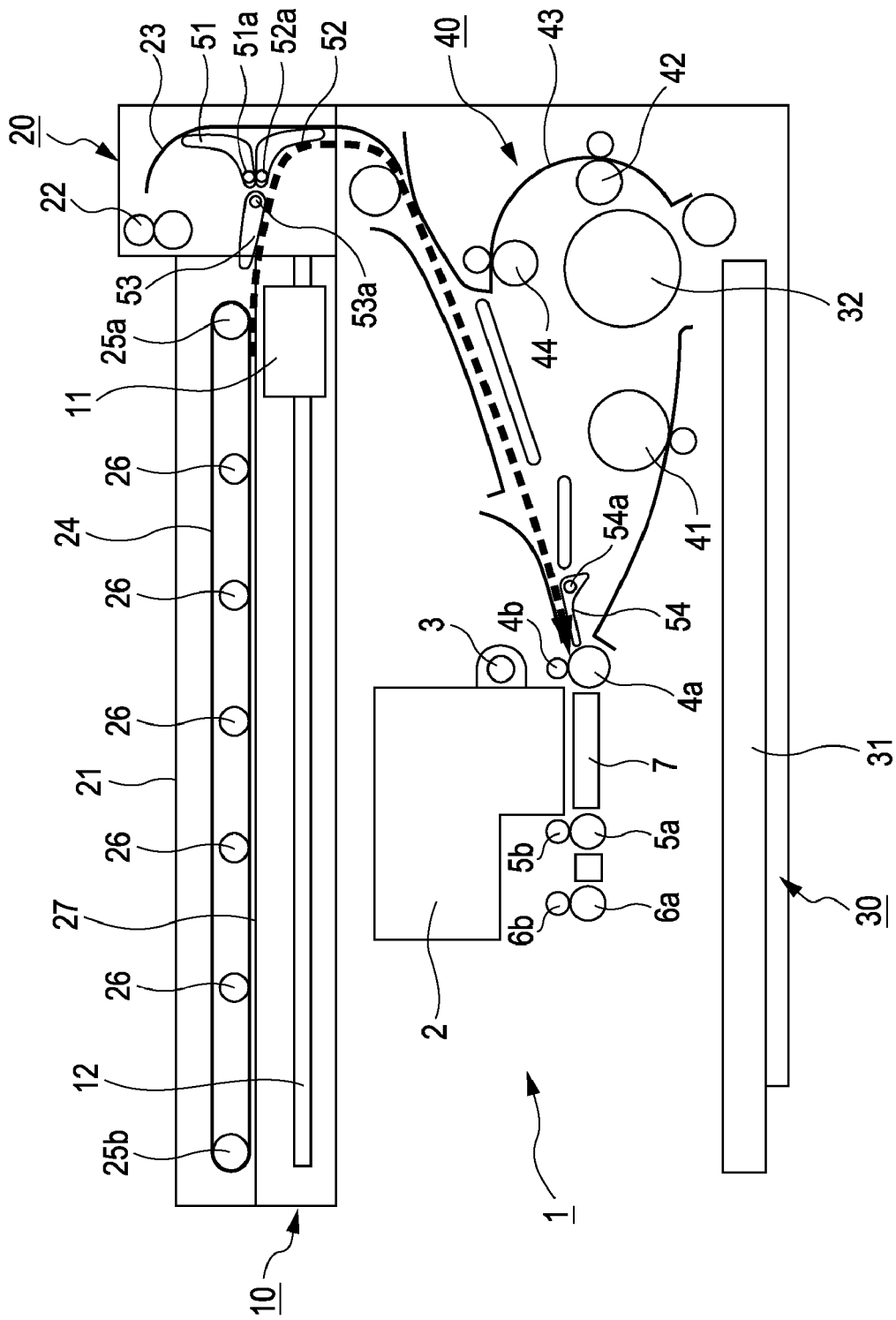
FIG. 7 is a side view showing a state where a sheet is being conveyed from the reading portion to the recording portion.

FIG. 6 is a side view showing a state where a sheet is being conveyed from the recording portion 1 to the reversing portion 40. In the state shown in FIG. 6, the fourth flapper 54 is rotated clockwise about the shaft 54a from the initial state in FIG. 1. Consequently, a sheet released from the recording portion 1 can be conveyed into the reversing portion 40, and then be conveyed through the reversing portion 40. Before the leading end of the sheet in the reversing portion 40 reaches the fourth flapper 54 again, the fourth flapper 54 is rotated counterclockwise about the shaft 54a so that the sheet with its front and back sides reversed can be conveyed to the recording portion 1 again. FIG. 7 is a side view showing a state where a sheet is being conveyed from the reading portion 10 to the recording portion 1. In the state shown in FIG. 7, the third flapper 53 is rotated clockwise about the shaft 53a from the initial state in FIG. 1. This forms a conveyance route extending from the reading portion 10 to the recording portion 1, whereby a sheet released from the reading portion 10 can be conveyed to the recording portion 1. Accordingly, in the first embodiment, the selective sheet conveying operation is performed by changing the positions of the flappers 51 to 54 disposed on the sheet conveying path. Furthermore, in the first embodiment, a sheet is conveyable bidirectionally between the reading portion 10 and the recording portion 1 as shown in FIGS. 4 to 7.

According to the first embodiment, the sheet processing apparatus equipped with the recording portion 1 and the reading portion 10 is capable of feeding an original or a recording medium to the recording portion 1 or the reading portion 10 by utilizing a common feeding portion (i.e. the first feeding portion 20 or the second feeding portion 30). This allows for compactness of the apparatus as well as cost reduction. In addition, the sheet processing apparatus is also capable of feeding an original or a recording medium to the recording portion 1 or the reading portion 10 by utilizing a common reversing portion, thereby allowing for compactness of the apparatus as well as cost reduction even if the apparatus is configured to have a reversing function.

Figure 8:
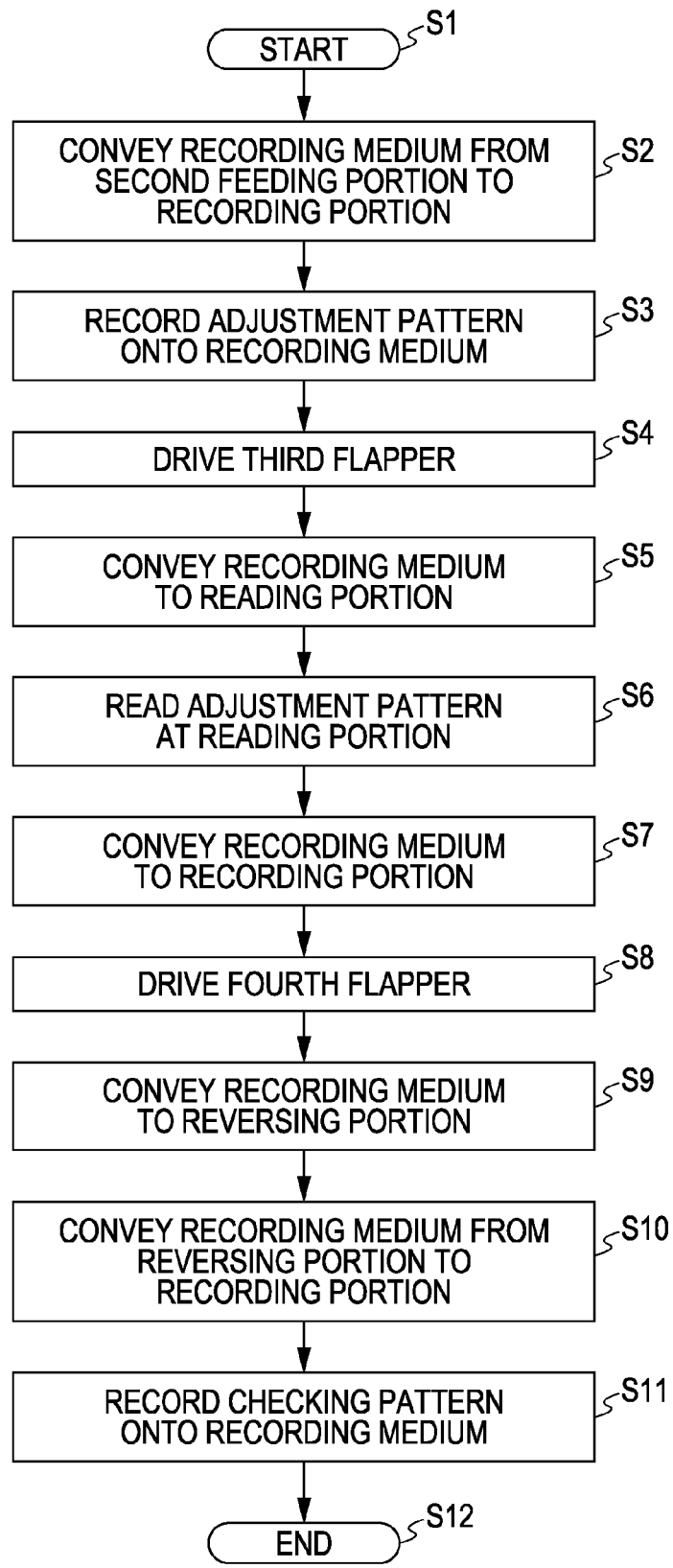
FIG. 8 is a flow chart showing an operation performed in the sheet processing apparatus according to the first embodiment.

FIG. 8 is a flow chart showing an operation performed in the sheet processing apparatus according to the first embodiment. With inkjet recording apparatuses, for example, there are cases where the user demands an adjustment of the recording head 2 before a recording operation. This adjustment is implemented for allowing ink droplets discharged from the recording head 2 to land on accurate positions on a sheet. In the related art, the user himself/herself determines whether or not an adjustment is necessary by reading an adjustment pattern recorded on a recording medium. If an adjustment is necessary, the user can input adjustment values to the main body of the recording apparatus or to a host computer connected to the apparatus.

Referring to FIG. 8, the sheet processing apparatus according to the first embodiment can automatically perform an adjustment of the recording head. Specifically, a recording medium having an adjustment pattern recorded thereon at the recording portion 1 is first conveyed towards the reading portion 10 as shown in FIG. 4. Based on the adjustment pattern read by the reading portion 10, an adjustment value is selected, and is then stored in the main body of the apparatus. Subsequently, this recording medium is released from the reading portion 10 and is temporarily conveyed to the recording portion 1 as shown in FIG. 7. Next, referring to FIG. 6, the recording medium is conveyed backwards to the reversing portion 40 where the front and back sides of the recording medium are reversed. Then, the recording medium is conveyed back to the recording portion 1. The recording portion 1 records a checking pattern on the second face of the recording medium, which is used for checking whether proper recording can be performed after the adjustment.

Referring to FIG. 8, when an adjustment mode starts in step S1, the process proceeds to step S2 where one of recording sheets stacked on the second sheet-holding base 31 is separated from the other sheets and conveyed to the recording portion 1 via the reversing portion 40. In step S3, the recording head 2 records an adjustment pattern on the conveyed recording sheet. In step S4, a driving source (not shown) rotates the third flapper 53 clockwise from its initial position. In step S5, the recording sheet with the adjustment pattern recorded thereon is conveyed to the reading portion 10 through the conveyance route shown in FIG. 4. In step S6, the reading portion 10 reads the adjustment pattern recorded on the recording sheet. Based on the adjustment pattern, an adjustment value is selected and stored in the main body of the apparatus.

Subsequently, in step S7, the recording sheet from which the adjustment pattern is read is conveyed from the reading portion 10 to the recording portion 1 as shown in FIG. 7. In step S8, a driving source (not shown) rotates the fourth flapper 54 clockwise. In step S9, the recording sheet is conveyed from the recording portion 1 to the reversing portion 40. In step S10, the recording sheet conveyed to the reversing portion 40 has its front and back sides reversed and is subsequently conveyed back to the recording portion 1. Then, in step S11, the recording portion 1 records a checking pattern on the second face of the reversed recording sheet. Specifically, a checking pattern is for checking whether a proper adjustment has been performed, and is an optimal pattern selected on the basis of the adjustment pattern read by the reading portion 10. In step S12, the recording sheet is ejected, thus ending the adjustment mode.

In the first embodiment, the first feeding portion 20 attached to the reading portion 10 and the second feeding portion 30 attached to the recording portion 1 are provided. The first feeding portion 20 separates and feeds sheets stacked on the first sheet-holding base 21 in a one-by-one manner through the first feeding roller 22, and the second feeding portion 30 separates and feeds sheets stacked on the second sheet-holding base 31 in a one-by-one manner through the second feeding roller 32. In the first embodiment, when original sheets or recording sheets stacked on these plurality of feeding portions are to be fed to the reading portion 10 or the recording portion 1, it is preferable that a feeding portion that provides a shorter feeding distance be selected for the sheet conveying operation. Furthermore, when original sheets or recording sheets stacked on these plurality of feeding portions are to be fed to the reading portion 10 or the recording portion 1, it is preferable that a suitable feeding portion be selected in accordance with the type of original or recording medium used.

Second Embodiment

Figure 9:
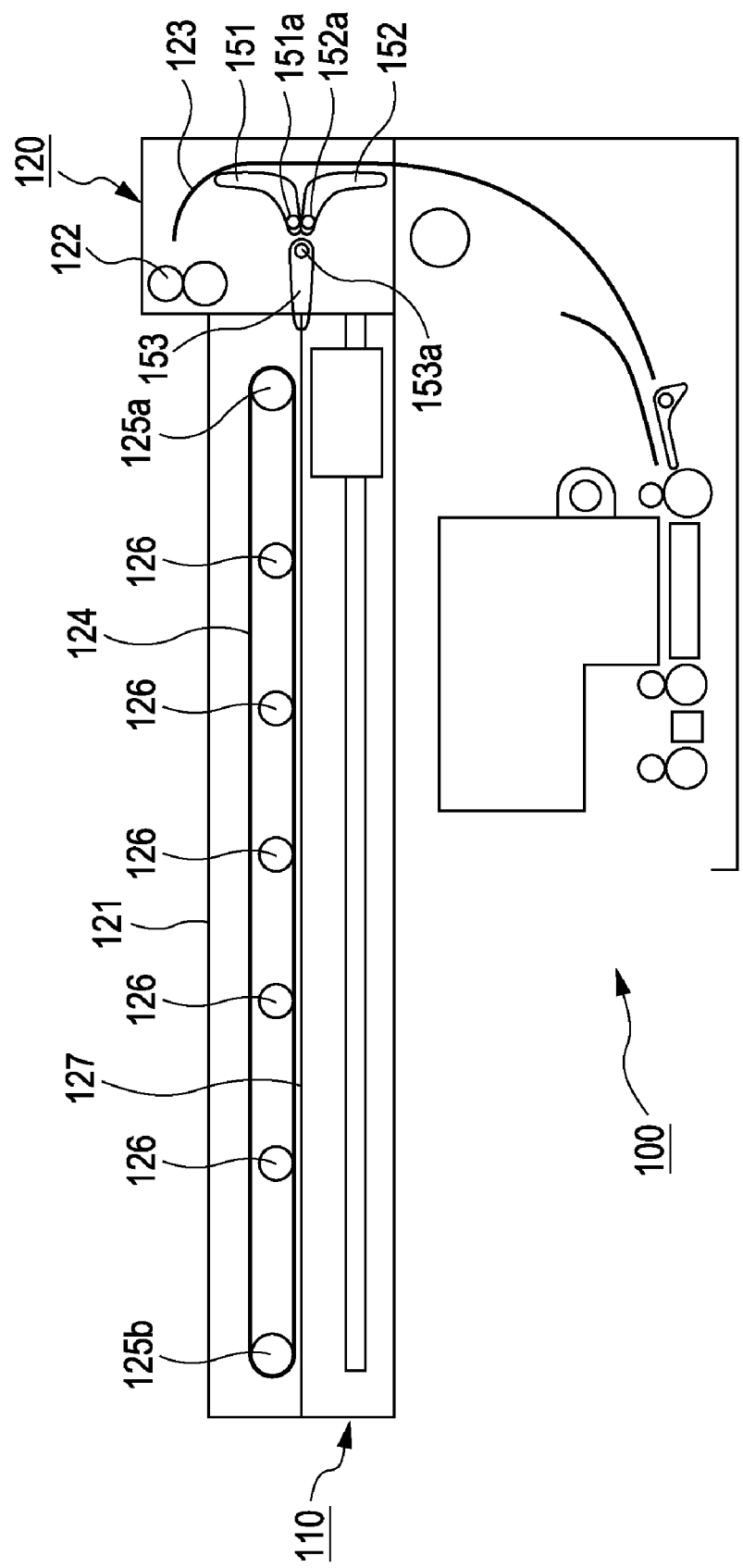
FIG. 9 is a side view of a sheet processing apparatus according to a second embodiment of the present invention in its initial state.

FIG. 9 is a side view of a sheet processing apparatus according to a second embodiment of the present invention in its initial state. In the first embodiment described above, there are provided two feeding portions 20 and 30 and a single reversing portion 40. In contrast, the sheet processing apparatus according to the second embodiment shown in FIG. 9 is provided with only a single feeding portion 120 that separates and feeds a plurality of original sheets or recording sheets one by one, in addition to a recording portion 100 that records an image onto a recording medium and a reading portion 110 that reads an original. The feeding portion 120 is attached to the reading portion 110. An original or a recording medium fed from the feeding portion 120 can be selectively conveyed to the reading portion 110 and the recording portion 100.

The feeding portion 120 separates and feeds sheets (original sheets or recording sheets) one by one, and includes a sheet-holding base 121, a feeding roller 122, and a guide mechanism 123. A plurality of sheets stacked on the sheet-holding base 121 is separated one by one by the feeding roller 122 so as to be fed in a one-by-one manner from the feeding portion 120. The guide mechanism 123 included in the feeding portion 120 is controllable such that each fed sheet can be guided selectively to the recording portion 100 or the reading portion 110. A belt 124 is driven by a driving source such as a motor (not shown) so as to convey each sheet guided by the guide mechanism 123 onto the upper surface of a glass 127 provided in the reading portion 110. The belt 124 is suspended between driving pulleys 125a and 125b. An intermediate portion of the belt 124 is supported by a plurality of rotatable idle pulleys 126.

Similar to the first embodiment, when a sheet fed from the feeding portion 120 is to be conveyed to the recording portion 100 or the reading portion 110, it is necessary to switch the conveyance routes. To achieve this, a plurality of flappers for switching conveyance routes is disposed at predetermined locations on the sheet conveying path. Specifically, a first flapper 151 is rotatably supported by a shaft 151a and is provided for switchably conveying a sheet fed from the feeding portion 120 towards the reading portion 110 or the recording portion 100. The first flapper 151 is switchable between a first position shown in FIG. 9 and a second position to which the first flapper 151 is rotated counterclockwise from the first position by a predetermined angle.

Furthermore, a second flapper 152 is rotatably supported by a shaft 152a and is provided for conveying a sheet from the reading portion 110 to the recording portion 100 or from the recording portion 100 to the reading portion 110. The second flapper 152 is switchable between a first position shown in FIG. 9 and a second position to which the second flapper 152 is rotated clockwise from the first position by a predetermined angle. Furthermore, a third flapper 153 is rotatably supported by a shaft 153a and is provided for conveying an original or recording medium from the feeding portion 120 to the reading portion 110 or from the reading portion 110 to the recording portion 100 or from the recording portion 100 to the reading portion 110. The third flapper 153 is switchable between a first position shown in FIG. 9 and a second position to which the third flapper 153 is rotated clockwise from the first position by a predetermined angle.

Figure 10:
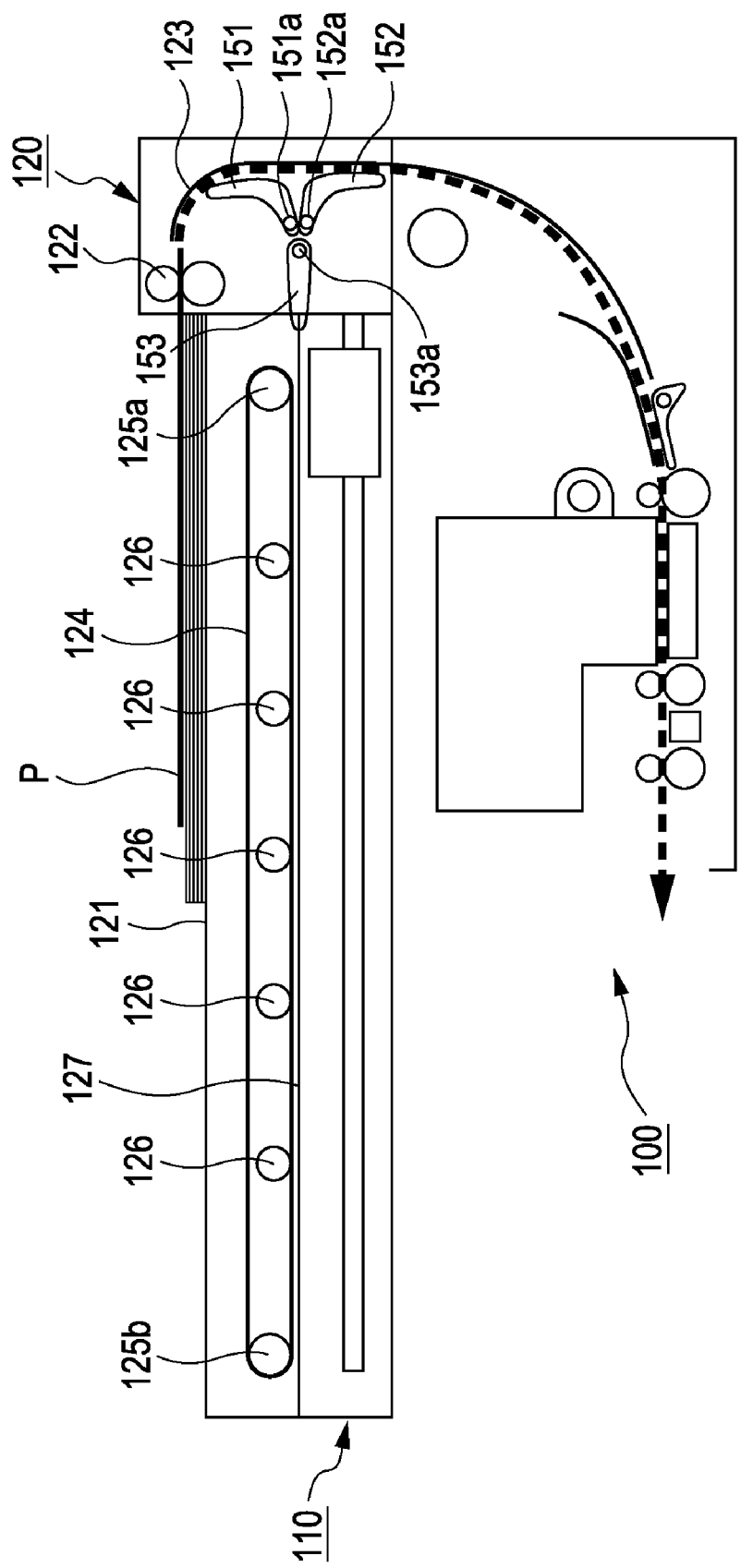
FIG. 10 is a side view showing a state where a sheet is being conveyed from a feeding portion to a recording portion.
Figure 11:
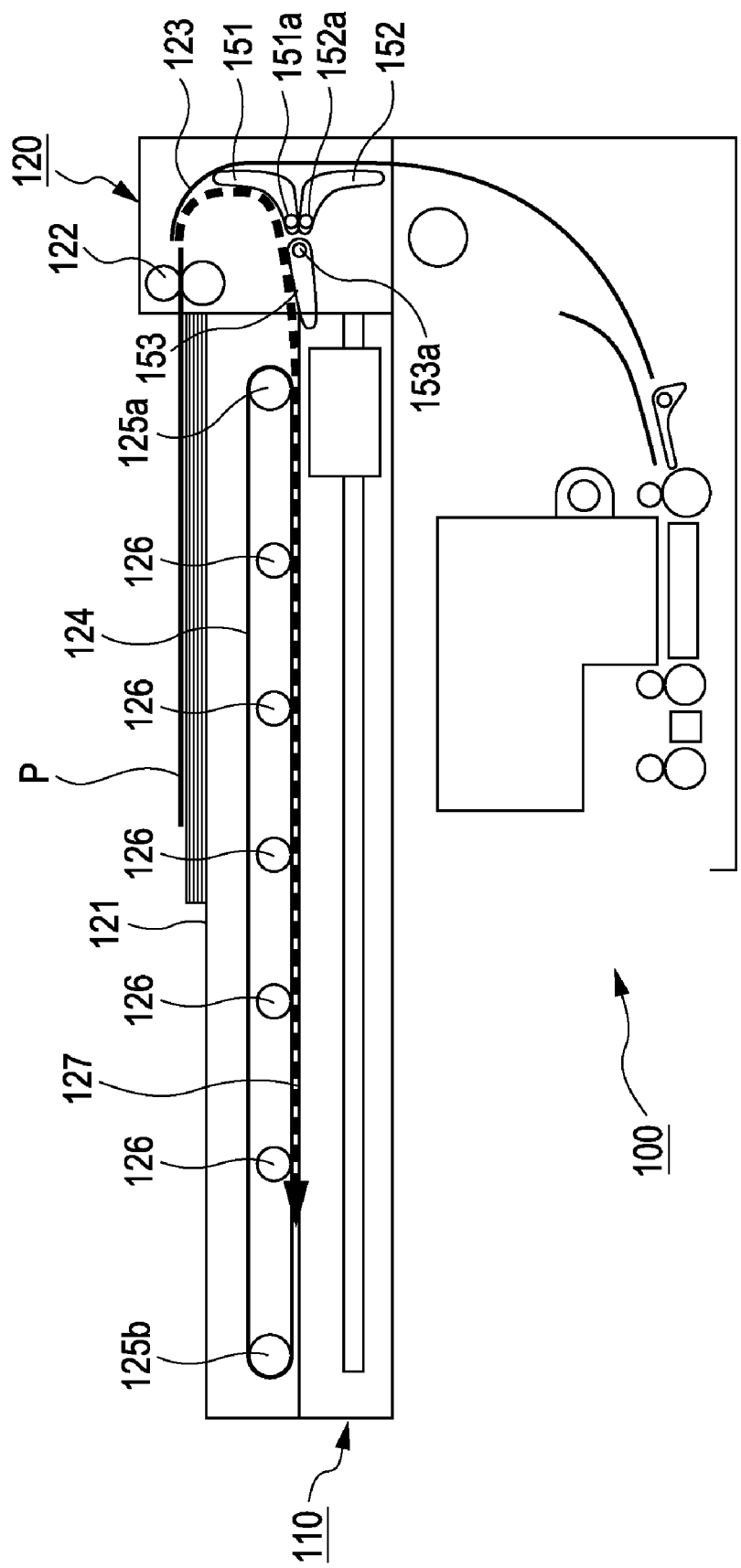
FIG. 11 is a side view showing a state where a sheet is being conveyed from the feeding portion to a reading portion.

FIG. 10 is a side view showing a state where a sheet is being conveyed from the feeding portion 120 to the recording portion 100. FIG. 11 is a side view showing a state where a sheet is being conveyed from the feeding portion 120 to the reading portion 110. In the state shown in FIG. 10, the first flapper 151 is rotated counterclockwise from the initial state shown in FIG. 9, and the second flapper 152 is rotated clockwise from the initial state, so that an original or recording medium fed from the feeding roller 122 can be conveyed to the recording portion 100. On the other hand, in the state shown in FIG. 11, the flappers are all at the same positions as those in the initial state in FIG. 9. In this state, when an original sheet or recording sheet is fed from the feeding portion 120 and separated from the other sheets at the feeding roller 122, the original sheet or recording sheet is guided to the reading portion 110 by the third flapper 153 so as to be set on the glass 127.

In the sheet processing apparatus equipped with the recording portion 100 and the reading portion 110 according to the second embodiment described above, an original or a recording medium fed from a single feeding portion 120 can be selectively conveyed to the recording portion 100 or the reading portion 110. This allows for compactness of the apparatus as well as cost reduction.

The term "image" used in this invention refers to all kinds of output images including characters and symbols. Moreover, the sheet material used may be of any kind regardless of material or shape as long as an image can be formed thereon. Examples of sheet materials that can be used are paper, plastic sheets, photographic paper, cloth, OHP sheets, etc. The recording portion is not limited to an inkjet type, and may be of any recording type such as a laser beam type, a thermal transfer type, a thermosensitive type, or a wire dot matrix type. The scanning method of the recording portion or the reading portion may be of any type, such as a serial type or a linear type.

According to the above embodiments of the present invention, a sheet processing apparatus equipped with a reading portion and a recording portion has a reduced number of feeding portions for feeding original sheets or recording sheets. Accordingly, a sheet processing apparatus that allows for cost reduction and compactness can be provided.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-118316 filed Apr. 27, 2007, which is hereby incorporated by reference herein in its entirety.

What is claimed is:

1. A sheet processing apparatus comprising:
   a feeding portion configured to feed sheets;
   a reading portion configured to read an image of a sheet;
   a recording portion configured to perform recording on a sheet;
   a single path through which the fed sheet is conveyable bidirectionally between the reading portion and the recording portion;
   a first guide member for guiding the fed sheet from the feeding portion selectively to the reading portion or the single path through which the sheet is conveyed to the recording portion; and
   a second guide member for guiding the sheet conveyed through the single path from the recording portion to the reading portion,
   wherein the sheet switchbacks in the recording portion when recorded sheet is conveyed to the reading portion through the single path.

2. The sheet processing apparatus according to claim 1, further comprising a flapper, wherein the fed sheet is selectively conveyed by changing a position of the flapper.

3. The sheet processing apparatus according to claim 1, wherein when the fed sheet is to be conveyed from the one of the plurality of feeding portions to the reading portion or the recording portion, the one of the plurality of feeding portions feeding the fed sheet is a feeding portion located proximate to the reading portion or the recording portion.

4. The sheet processing apparatus according to claim 1, wherein one of the feeding portions is attached to the reading portion.

5. The sheet processing apparatus according to claim 1, wherein one of the feeding portions is attached to the recording portion.

* * * * *